United States Patent [19]
Nicholas

[11] Patent Number: 5,738,447
[45] Date of Patent: Apr. 14, 1998

[54] PAD BEARING ASSEMBLY WITH FLUID SPRAY AND BLOCKER BAR

[75] Inventor: John C. Nicholas, Wellsville, N.Y.

[73] Assignee: Rotating Machinery Technology, Inc., Wellsville, N.Y.

[21] Appl. No.: 828,759

[22] Filed: Apr. 1, 1997

[51] Int. Cl.⁶ .................................................. F16C 17/03
[52] U.S. Cl. ............................ 384/117; 384/307; 384/311
[58] Field of Search .................................. 384/117, 122, 384/306, 307, 309, 311, 137

[56] References Cited

U.S. PATENT DOCUMENTS

| | | | |
|---|---|---|---|
| 2,348,928 | 5/1944 | Sampatacos | 384/309 |
| 2,507,021 | 5/1950 | Lakey | 384/307 |
| 3,378,319 | 4/1968 | Cutting et al. | 384/100 |
| 3,454,312 | 7/1969 | Bielec | 384/307 |
| 3,893,737 | 7/1975 | Tyson | 384/307 |
| 3,982,796 | 9/1976 | Hill | 384/307 |
| 4,247,157 | 1/1981 | Sigg | 384/307 |
| 4,291,926 | 9/1981 | Tomioka et al. | 384/311 |
| 4,335,925 | 6/1982 | Stopp | 384/307 X |
| 4,456,391 | 6/1984 | New | 384/307 |
| 4,497,587 | 2/1985 | Pine | 384/117 |
| 4,501,505 | 2/1985 | Chambers | 384/152 |
| 4,566,204 | 1/1986 | Chambers | 384/152 |
| 5,423,613 | 6/1995 | Keck et al. | 384/311 |
| 5,518,321 | 5/1996 | Hata | 384/311 |
| 5,547,287 | 8/1996 | Zeidan | 384/117 |

*Primary Examiner*—Thomas R. Hannon
*Attorney, Agent, or Firm*—St. Onge Steward Johnston & Reens LLC; Gene S. Winter

[57] ABSTRACT

A bearing assembly for supporting a rotatable member, which includes a bearing casing with an inner surface and a fluid drain outlet, and pads mounted on the inner surface of the casing, is provided. Each pad has a face facing the rotatable member and has a leading edge and a trailing edge with respect to the rotation of the rotatable member. A spray bar is positioned adjacent the leading edge of each of the pads, and the spray bar has a fluid ejecting conduit positioned to forcibly eject lubricating fluid toward the leading edge and onto the pad face. The spray bar also includes a fluid blocking segment adjacent the rotatable member for blocking heated fluid from being carried by the rotation of the rotatable member to the leading edge of the next pad in the direction of the rotation, and a fluid removal segment in fluid communication with the fluid drain outlet. The fluid removal segment is obtusely inclined with respect to the fluid blocking segment for directing the heated fluid to the fluid drain outlet to expedite removal of the heated fluid from the bearing assembly.

12 Claims, 3 Drawing Sheets

PAD BEARING ASSEMBLY WITH FLUID SPRAY AND BLOCKER BAR

FIELD OF THE INVENTION

The invention relates to a pad bearing assembly and more specifically, to a pad bearing assembly which uses spray and blocker bars to more effectively and efficiently remove heated lubricating fluid and introduce cooler lubricating fluid into the bearing assembly.

BACKGROUND OF THE INVENTION

Rotatable equipment, such as a high-speed shaft of a turbo-generator unit, are commonly supported along its tenth by fluid film-lubricated pad bearing assemblies. The fluid film-lubricated pad bearing assemblies serve to dampen the horizontal and/or vertical movements of the rotating equipment. As known, these bearing assemblies provide a thin film of lubricant, typically oil, between the pads of the assembly and the rotatable equipment to provide a reduced-friction operational interface. With today's increasing rotatable equipment speeds and/or loads, the fluid film-lubricated pad bearing assemblies are increasingly operating at or above temperatures where the frictional force between the rotating equipment and the assembly present significant energy losses, as well as the possibility of damage to the bearing assembly and the rotating equipment.

In order to address the problems associated with increasing rotatable equipment speeds and/or loads, several solutions have been proposed heretofore. One such prior art solution is disclosed in U.S. Pat. No. 4,247,157 ("the '157 patent") to Sigg. (The following description of the '157 patent uses reference numerals found in the '157 patent.)

The '157 patent discloses a cant segment-radial bearing 10 having at least one tiltable support segment 18 and at least two tillable guide segments 20 (col. 5, lines 2–26; FIGS. 1 and 2). The support segment 18, which supports a rotatable shaft 12, has a width B which is considerably greater than the diameter D of the shaft (col. 5, lines 42–46; FIGS. 1 and 2). In each intermediate space between the support segment 18 and each guide segment 20, and the intermediate space between the guide segments 20, there are positioned two separate nozzle pipes 38, 48 having a series of nozzles 40, 50, respectively, for introducing cool lubricating fluid 42, 52 into the bearing 10 (col. 5, line 65 to col. 6, line 23; FIG. 2).

One nozzle pipe 38 is positioned adjacent the trailing edge 44 of each segment 18 or 20, while the other nozzle pipe 48 is positioned adjacent the leading edge 54 of each segment 18 or 20 (col. 6, lines 5–23; FIG. 2). The introduction of cool lubricating fluid 42, 52 into the bearing I0 in the maimer disclosed, combined with the removal of heated lubricating fluid from the bearing, serve to decrease the temperature within the bearing 10. The heated lubricating fluid is directed by shields 56, 58 secured to the nozzle pipes 38, 48, respectively, to a lubricant outflow groove 60 extending in a circumferential direction at the central region of the support segment (col. 6, lines 24–44; FIGS. 1 and 2).

The disadvantages of the '157 patent are as follows. First, the cool lubricating fluid introduced into the bearing is mixed with the heated lubricating fluid carried over film the preceding segment so the temperature within the bearing is not reduced as desired. And second, the utilization of two separate nozzle pipes for each intermediate space between the segments is costly to manufacture and maintain.

Another prior art solution for addressing the problems associated with increasing rotatable equipment speeds and/or loads is disclosed in U.S. Pat. No. 4,497,587 ("the '587 patent") to Pine. (The following description of the '587 patent uses reference numerals found in the '587 patent.)

The '587 patent discloses a three-pad journal bearing 11 having pads 20, 72, 82 on an inner surface 13 of bearing casing 12 for supporting a shaft 10 (col. 3, lines 57–63; FIG. 1). Each of the three pads 20, 72, 82 has associated with it an oil feed dam 50, 78, 88, respectively, positioned at the leading edge 40, 77, 87 thereof (col. 4, line 47 to col. 6, line 8; FIG. 1). The oil feed dams 50, 78, 88 include a damming ridge 52 which extends toward and proximate the shaft 10 (col. 4, lines 54–56; FIG. 1). Each oil feed dam 50, 78, 88 also has a radially extending feed line 64 extending therethrough for supplying lubricating oil to the three-pad journal bearing 11 (col. 4, lines 62–64; FIG. 1).

The lubricating oil is supplied at low pressure to a channel 60 between the oil feed dam 50, 78, 88 and the corresponding pad 20, 72, 82, where it accumulates until the rotation of the shaft 10 carries it into the interstice between shaft surface 24 and pad face 22 (col. 4, line 64 to col. 5, line 6; FIG. 1). The heated oil is then ejected from the three-pad journal bearing 11 when the rotation of the shaft 10 carries the oil into arcuate spaces 70, 79, 89 beyond the trailing edge of each pad 20, 72, 82 which are in fluid communication with grooves 112, 114 and a drain passage 116 (col. 5, line 28 to col. 7, line 8; FIGS. 1 and 2). The damming ridge 52 substantially limits the heated oil in the arcuate spaces 70, 79, 89 from entering the channels 60 of the adjacent oil feed dams 50, 78, 88 (col. 6, lines 63–66).

The disadvantages of the '587 patent are as follows. First, because the oil introduced into the channel 60 is distributed only by the rotation of the shaft 10, the oil supplied by the feed line 64 does not provide the necessary lubrication between the pad face 22 and the shaft surface 24 especially when the shaft 10 is first being operated. This lack of lubrication poses damage possibilities to both the shaft and the three-pad journal bearing 11. And second, removal of the heated oil via collection in the arcuate spaces 70, 79, 89 does not result in the immediate removal of the heated oil from the three-pad journal bearing 11; thus, the temperature inside the bearing is not reduced as quickly as desired.

What is desired, therefore, is a pad bearing assembly which quickly removes heated fluid from inside the bearing assembly, which provides the necessary lubrication between the rotatable equipment and the pads of the bearing assembly, even when the rotatable equipment is first being operated, and which is substantially simple and economical to manufacture and maintain.

SUMMARY OF THE INVENTION

Accordingly, it is an object of the invention to provide a pad bearing assembly which quickly removes heated fluid from inside the bearing assembly.

Another object of the invention is to provide a pad bearing assembly which provides the necessary lubrication between the rotatable member and the pads of the assembly, even when the rotatable member is first being operated.

Still another object of the invention is to provide a pad bearing assembly which is substantially simple and economical to manufacture and maintain.

Yet another object of the invention is to provide a pad bearing assembly which reduces energy losses film the frictional force between the rotatable member and the pads of the assembly.

These and other objects of the invention are achieved by a bearing assembly for supporting a rotatable member, which includes a bearing casing with an inner surface and a fluid drain outlet, and pads mounted on the inner surface of the casing. Each pad has a face facing the rotatable member and has a leading edge and a trailing edge with respect to the rotation of the rotatable member. A spray bar is positioned adjacent the leading edge of each of the pads, and the spray bar has a fluid ejecting conduit positioned to forcibly eject lubricating fluid toward the leading edge and onto the pad face. The spray bar also includes a fluid blocking segment adjacent the rotatable member for blocking heated fluid from being carried by the rotation of the rotatable member to the leading edge of the next pad in the direction of the rotation, and a fluid removal segment in fluid communication with the fluid drain outlet. The fluid removal segment is obtusely inclined with respect to the fluid blocking segment for directing the heated fluid to the fluid drain outlet to expedite removal of the heated fluid from the bearing assembly.

The invention and its particular features and advantages will become more apparent from the following detailed description considered with reference to the accompanying drawings.

DETAILED DESCRIPTION OF THE INVENTION

Figure 1:
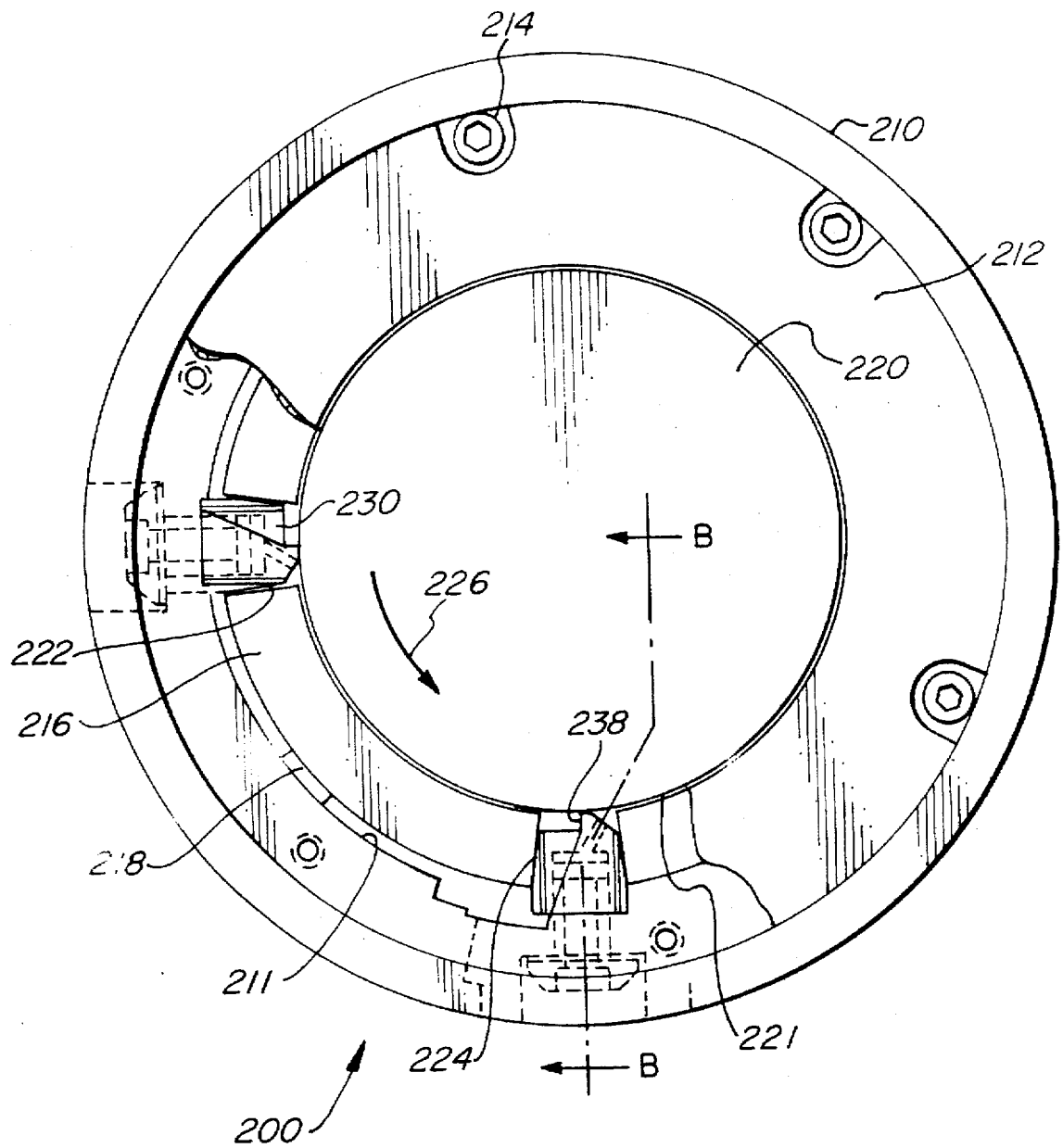
FIG. 1 is a radial end view of a pad bearing assembly in accordance with the present invention with a portion of an end cover cutaway to show spray and blocker bars.

FIG. 1 is a radial view of a pad bearing assembly 200 in accordance with the present invention. The assembly 200 includes a bearing casing 210 having an inner surface 211, end covers 212 (one of which is shown here) secured to the casing 210 in a conventional manner, such as by screws 214, and pads 216 mounted on the inner surface 211 of the casing 210. The pads 216 are tiltably mounted on the inner surface 211 by means of pivoting members 218 which are pivotally retained in openings (not shown) of the casing 210. Other known manners of tiltably mounting the pads 216 may also be employed.

A rotatable member 220, such as the shaft shown in FIG. 1, is supported by and surrounded by the pads 216. The tiltability of the pads 216 permits accommodation of horizontal and vertical shifts of the rotatable member 220. Each pad 216 has a face 221 facing the rotatable member 220, and a leading edge 222 and a trailing edge 224 with respect to the rotation of the rotatable member 220, which for illustrative purposes has been selected in FIG. 1 as the counterclockwise direction 226.

Figure 2:
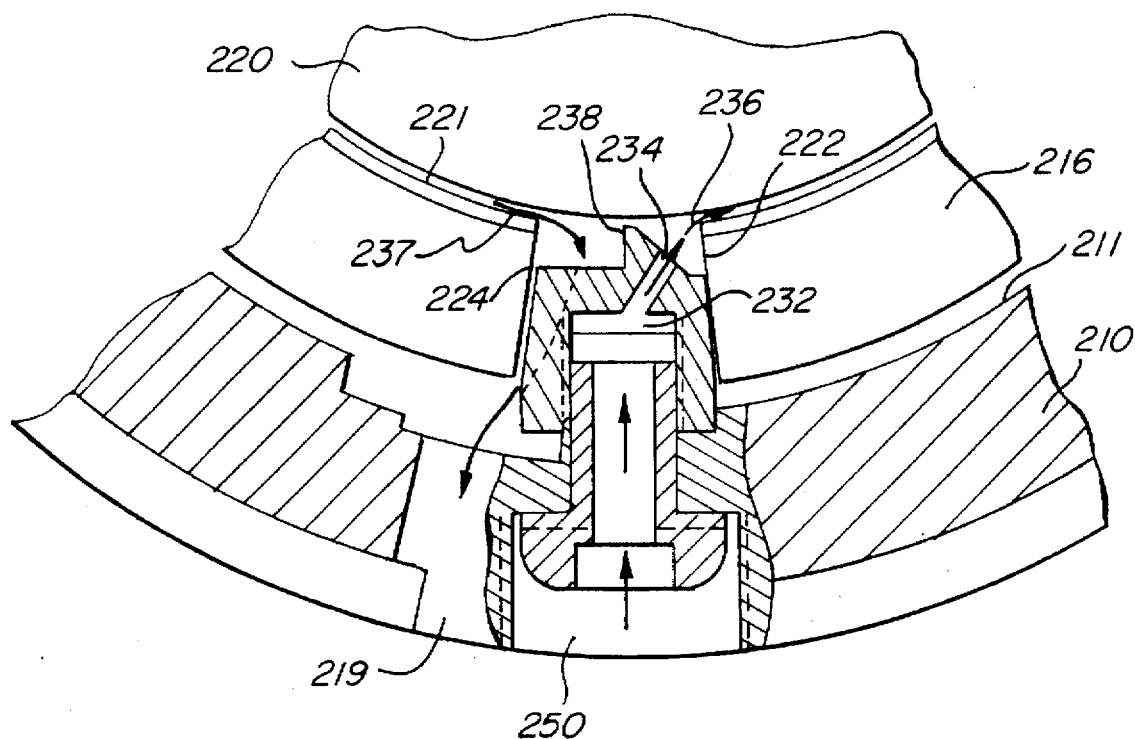
FIG. 2 is a cross-sectional radial view of a portion of the pad bearing assembly of FIG. 1 showing the spray and blocker bar.

A spray bar 230 is secured to the inner surface 211 of the casing 210 adjacent the leading edge 222 of each pad 216. Preferably, there is a small gap between the leading edge 222 of the pad 216 and the spray bar 230 to permit the pad 216 to tilt as needed. Although the spray bars 230 in FIGS. 1 and 2 are shown being adjacent the leading edge 222 of one pad and the trailing edge 224 of the preceding pad in the direction of the rotation, it is to be understood that the spray bar 230 need not be adjacent the trailing edge 224 of the preceding pad. This is preferable, however, as will be described hereinbelow.

Figure 3:
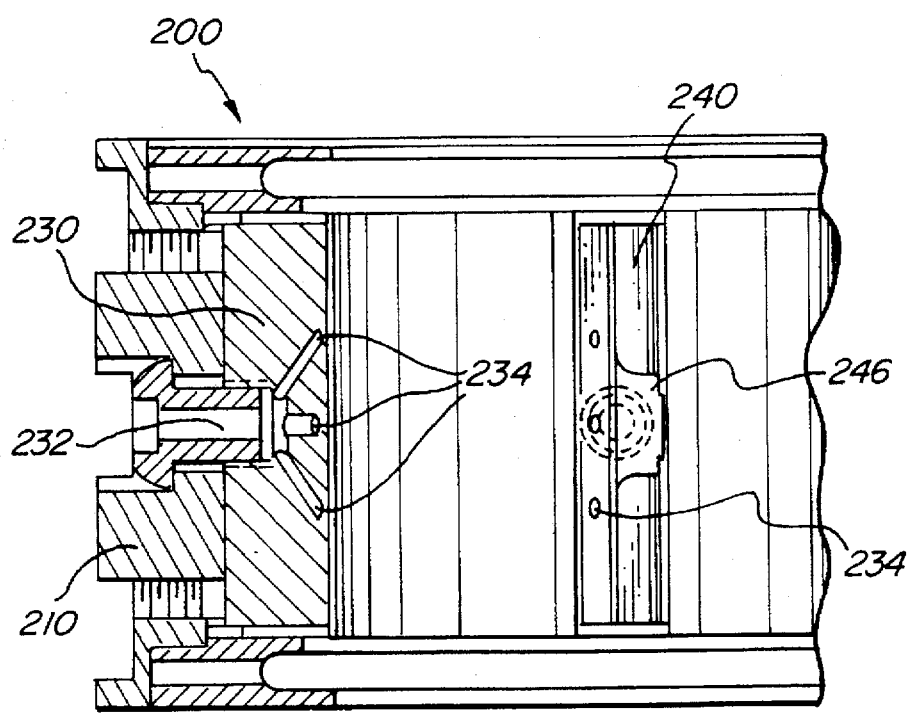
FIG. 3 is a cross-sectional view along line B—B of the pad bearing assembly of FIG. 1 without the rotatable member.
Figure 4:
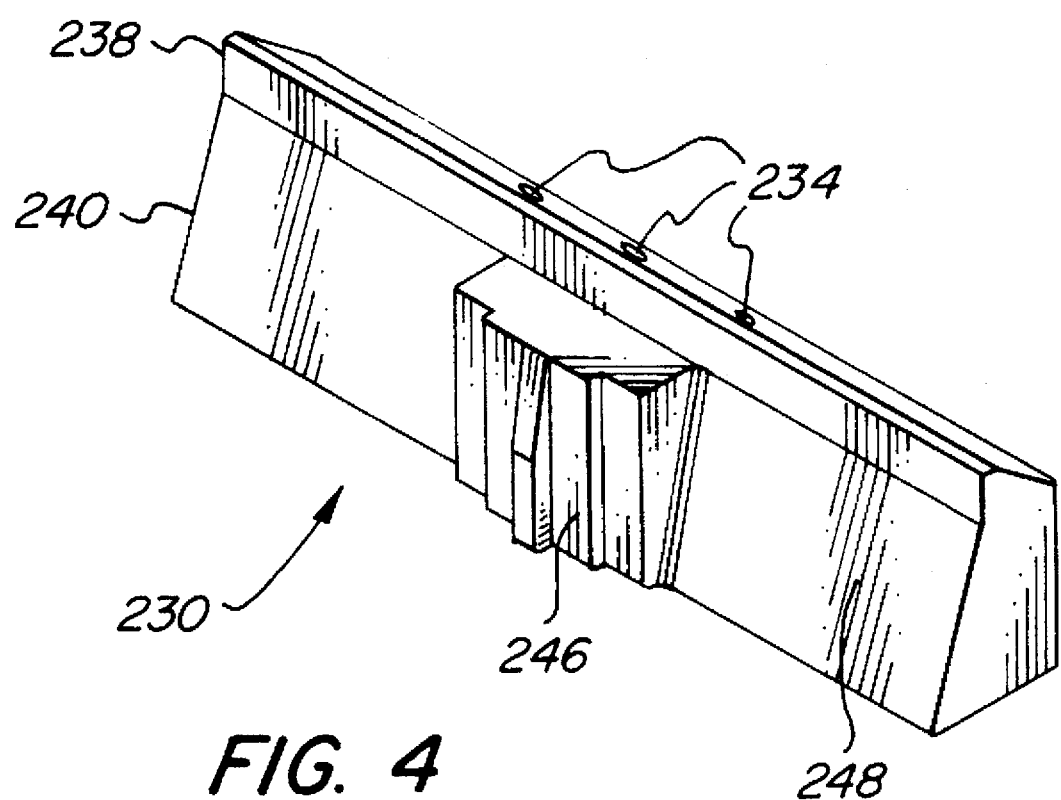
FIG. 4 is a perspective view of the spray and blocker bar of FIG. 1.

Referring to FIGS. 2-4, the spray bar 230 is shown in greater detail. The spray bar 230 has a fluid ejecting conduit 232 in fluid communication with fluid ejecting apertures 234. The fluid ejecting apertures 234 are positioned so that fluid 236 ejecting therefrom is directed toward the leading edge 222 and onto the pad face 221, as shown on FIG. 2. In the present embodiment in which there are three fluid ejecting apertures 234 illustrated for exemplary purposes, the center aperture is larger in size than the outer apertures (see FIG. 3) so that the lubricating fluid 236 is substantially evenly distributed along the shaft 220 during the operation of the pad bearing assembly 200. Furthermore, the apertures 234 are spaced from one another to dispersively eject the fluid 236 for better distribution of the lubricating fluid 236, as shown in FIGS. 3 and 4. It should be noted that the number of apertures, the size of the apertures and/or the space between the apertures may be varied as desired.

A fluid reservoir 250 in fluid communication with the fluid ejecting conduit 232 provides the fluid 236 to the fluid ejecting conduit 232 under pressure so that the fluid 236 is expelled by the force of the pressure through the apertures 234. In this manner, the lubricating fluid 236 is effectively provided between the rotatable member 220 and the pads 216, even when the rotatable member 220 is first being operated. The fluid reservoir 250 may be a tube or pipe in the bearing casing 210 which provides the lubricating fluid 236 to the spray bars 230 of the bearing assembly 200, or some other known means of providing the lubricating fluid 236 to the spray bars 230. The fluid reservoir 250 is in fluid communication with a fluid pumping trait (not shown) external to the bearing casing 210.

The spray bar 230 also includes a fluid blocking segment 238 and a fluid removal segment 240. The fluid blocking segment 238 is situated adjacent the rotatable member 220 for blocking most of heated fluid 237 carried by the rotation of the rotatable member 220 from entering the leading edge 222 of the next pad 216 in the direction of the rotation. This is best illustrated in FIG. 2. Preferably, a separation of approximately 0.005 inch to 0.015 inch between the fluid blocking segment 238 and the rotatable member 220 is desired.

The blocked heated fluid 237 is directed by the fluid removal segment 240 for removal from the bearing assembly 200. The fluid removal segment 240 is in fluid communication with a fluid drain outlet 219 of the bearing casing 210. Preferably, there is a corresponding fluid drain outlet 219 for each spray bin 230 so that the heated fluid 237 is expeditiously removed from the bearing casing 210 to reduce the temperature therewithin.

The fluid removal segment 240 is preferably inclined at an obtuse angle with respect to the fluid blocking segment 238 as shown in FIG. 4. This design permits the expeditious removal of the heated fluid 237 from the bearing casing 210 since the blocked heated fluid 237 is effectively directed by the slope of the fluid removal segment 240 to the fluid drain outlet 219 for fast and efficient removal. Furthermore, it is preferable to provide a divider 246 on the removal segment 240 to form separate channels 248 thereon so that the heated fluid 237 is divided and then directed over the separate channels 248 for expeditious removal of the heated fluid 237 from the bearing casing 210. It has been shown during testing that dividing the heated fluid 237 and directing the divided heated fluid 237 over separate channels for removal is more efficient and effective than removing the heated fluid 237 by providing a single flat surface for removal as shown in the prior art. Note that other means for providing channels may also be employed, e.g., use of grooves, if desired. The obtusely inclined removal segment 240 and the channels 248 thereon provide an expeditious and effective manner of reducing the temperature within the bearing casing 210.

Various experiments performed with the pad bearing assembly 200 of the present invention have demonstrated the effectiveness of the invention versus prior art bearings in lowering the temperature inside the bearing assembly. For example, in one experiment conducted using a 1325 lbs. shaft operated between 10K to 14K RPMs, it was shown that the bearing assembly 200 reduced the temperature present on the pads 216 by more than 13 degrees Fahrenheit over some prior art bearings.

As should be apparent to those skilled in the art, the smaller the size of the pads 216 and the greater the number of spray bars 230 utilized, the lower the temperature within the bearing casing 210. The number of pads 216 employed as well as the number of spray bars 230 used will depend upon, among other factors, the weight of the rotatable member 220 and the operable RPM range.

Furthermore, as will be appreciated by those skilled in the art, the bearing assembly of the present invention can be modified without difficulty for thrust bearings.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A bearing assembly for supporting a rotatable member, which comprises:

a bearing casing having an inner surface and a fluid drain outlet;

a plurality of pads mounted on said inner surface of said bearing casing, each pad having a face facing the rotatable member and having a leading edge and a trailing edge with respect to the rotation of the rotatable member;

a spray bar positioned adjacent said leading edge of each said pad, said spray bar having a fluid ejecting conduit positioned to forcibly eject fluid toward said leading edge and onto said pad face;

said spray bar including a fluid blocking segment adjacent the rotatable member for blocking heated fluid from being carried by the rotation of the rotatable member to said leading edge of next said pad in the direction of the rotation; and said spray bar including a fluid removal segment in fluid communication with said fluid drain outlet, said fluid removal segment obtusely inclined with respect to said fluid blocking segment for directing the heated fluid to said fluid drain outlet to expedite removal of the heated fluid from the bearing assembly.

2. The bearing assembly of claim 1, wherein said pads are tiltably mounted on said inner surface of said bearing casing to accommodate horizontal and vertical shifts of the rotatable member.

3. The bearing assembly of claim 1, wherein said fluid ejecting conduit comprises a plurality of fluid ejecting apertures of different size spaced from one another to dispersively eject the fluid.

4. The bearing assembly of claim 1, further comprising a fluid reservoir in fluid communication with said fluid ejecting conduit, said fluid reservoir supplying the fluid to said fluid ejecting conduit under pressure so that the fluid is forcibly ejected from said fluid ejecting conduit.

5. The bearing assembly of claim 1, wherein the separation between said fluid blocking segment and the rotatable member is between 0.005 inch to 0.015 inch.

6. The bearing assembly of claim 1, wherein said fluid removal segment defines channels for directing the heated fluid to said fluid drain outlet.

7. A bearing assembly for supporting a rotatable shaft, which comprises:

a bearing casing having an inner surface and a plurality of fluid drain outlets;

pads attached to said inner surface of said bearing casing, each pad having a face facing the shaft and having a leading edge and a trailing edge with respect to the rotation of the shaft;

a spray bar positioned adjacent said leading edge of each said pad, said spray bar having fluid ejecting apertures for forcibly ejecting fluid toward said leading edge and onto said pad face;

said spray bar including a fluid blocking segment adjacent the shaft for blocking heated fluid from being carried by the rotation of the shaft to said leading edge of next said pad in the direction of the rotation; and said spray bar including a fluid removal segment in fluid communication with one of said fluid drain outlets, said fluid removal segment obtusely inclined with respect to said fluid blocking segment for directing the heated fluid to said fluid drain outlet to expedite removal of the heated fluid from the bearing assembly.

8. The bearing assembly of claim 7, wherein said pads are tiltably mounted on said inner surface of said bearing casing to accommodate horizontal and vertical shifts of the shaft.

9. The bearing assembly of claim 7, further comprising a fluid reservoir in fluid communication with said fluid ejecting apertures, said fluid reservoir supplying the fluid to said fluid ejecting apertures under pressure so that the fluid is forcibly ejected from said fluid ejecting apertures.

10. The bearing assembly of claim 7, wherein the separation between said fluid blocking segment and the shaft is between 0.005 inch to 0.015 inch.

11. The bearing assembly of claim 7, wherein said fluid removal segment defines at least one channel for directing the heated fluid to said fluid drain outlet.

12. A bearing assembly for supporting a rotatable shaft, which comprises:

a bearing casing having an inner surface and fluid drain outlets;

a plurality of pads mounted on said inner surface of said bearing casing, each pad having a face facing the shaft and having a leading edge and a trailing edge with respect to the rotation of the shaft;

a spray bar positioned adjacent said leading edge of each said pad, said spray bar having fluid ejecting apertures of different size for forcibly ejecting fluid toward said leading edge and onto said pad face;

a fluid reservoir in fluid communication with said fluid ejecting apertures, said fluid reservoir supplying the fluid to said fluid ejecting apertures under pressure so that the fluid is forcibly ejected from said fluid ejecting apertures;

said spray bar including a fluid blocking segment adjacent the shaft for blocking heated fluid from being carried by the rotation of the shaft to said leading edge of next said pad in the direction of the rotation; and said spray bar including a fluid removal segment in fluid communication with one of said fluid drain outlets, said fluid removal segment defining channels and being obtusely inclined with respect to said fluid blocking segment for directing the heated fluid to said fluid drain outlet to expedite removal of the heated fluid from the bearing assembly.

* * * * *